United States Patent
Ahmed (10) Patent No.: US 12,325,643 B1
(45) Date of Patent: Jun. 10, 2025

(54) SYNTHESIS OF COBALT OXIDE NANOPARTICLES USING L-VALINE AS A FUEL

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/931,388

(22) Filed: Oct. 30, 2024

(51) Int. Cl.
C01G 51/04 (2025.01)

(52) U.S. Cl.
CPC .......... *C01G 51/04* (2013.01); *C01P 2002/60* (2013.01); *C01P 2002/72* (2013.01); *C01P 2004/03* (2013.01); *C01P 2004/04* (2013.01); *C01P 2004/32* (2013.01); *C01P 2004/61* (2013.01); *C01P 2004/64* (2013.01); *C01P 2006/12* (2013.01); *C01P 2006/14* (2013.01); *C01P 2006/16* (2013.01)

(58) Field of Classification Search
CPC .................................................. C01G 51/04
See application file for complete search history.

(56) References Cited

U.S. PATENT DOCUMENTS

| 5,114,702 A | 5/1992 | Pederson et al. |
| 2012/0161076 A1 | 6/2012 | Kahn et al. |
| 2019/0164699 A1 | 5/2019 | Zeng et al. |

FOREIGN PATENT DOCUMENTS

| CN | 101830440 A | 9/2010 |
| CN | 110625125 B | 5/2022 |
| CN | 115651000 A | 1/2023 |

OTHER PUBLICATIONS

Farid El-Dossoki, et al., "Synthesis of Co3O4 nanoparticles from amino acids mixed ligands and its adsorption properties", Alfarama Journal of Basic & Applied Sciences, vol. 1, Issue 1, Jan. 2020 (12 pages).
Srinatha N. et al.. "Spectroscopic investigation of an intrinsic room temperature ferromagnetism in Co doped ZnO nanoparticles", Journal of Electron Spectroscopy and Related Phenomena, vol. 195, Aug. 2014 (6 pages).

*Primary Examiner* — James A Fiorito
(74) *Attorney, Agent, or Firm* — Oblon, McClelland, Maier & Neustadt, L.L.P.

(57) ABSTRACT

A method for synthesizing cobalt oxide nanoparticles includes mixing an aqueous solution of a cobalt precursor and L-valine to obtain a reaction mixture and heating up the reaction mixture to temperature of at least 100° C. to obtain a dry powder. The method further includes calcining the dry powder to obtain the cobalt oxide nanoparticles. The cobalt oxide nanoparticles have an average particle size of 200 nm or less. The cobalt oxide nanoparticles are substantially spherical and include mesopores having a total pore volume of 0.1 to 0.5 cm$^3$/g.

20 Claims, 6 Drawing Sheets

SYNTHESIS OF COBALT OXIDE NANOPARTICLES USING L-VALINE AS A FUEL

BACKGROUND

Technical Field

The present disclosure is directed to a method for the synthesis of nanoparticles, more particularly, a method for the synthesis of cobalt oxide nanoparticles using L-valine as a fuel.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Nanotechnology has many applications including, but not limited to, energy production, environmental purification, food production, biomedicine, and electronics. These applications span a wide range of industries, including pharmaceuticals, cosmetics, textiles, opto-electronics, and agriculture. Nanoparticles may behave in contrast to their bulk counterparts and may exhibit superior properties, such as high stability, a high surface area with respect to volume ratio, tuneable optical properties, and other size-dependent properties such as reactivity, melting point, and electrical conductivity. Nanoparticles are, therefore, attractive for use in areas such as surface coating, optical communications, sensors, and semiconductors due to their adjustable properties. Cobalt oxide nanoparticles possess many advantages in semiconductors and capacitors due to cobalt oxide's low cost, good environmental compatibility, and high theoretical capacitance. Cobalt oxide is found to be in four stable states: cobalt (II) oxide (CoO), cobalt (III) oxide ($Co_2O_3$), cobalt (IV) oxide ($CoO_2$), and cobalt (II, III) oxide ($Co_3O_4$). $Co_3O_4$ is a useful cobalt form in semiconductors and capacitors, due to its excellent thermal stability and electrochemical capacitance behavior.

Synthesizing nanoparticles requires controlled synthesis such as such as sol-gel, hydrothermal, solvothermal, and chemical vapor deposition (CVD). However, these synthesis techniques pose challenges due to high costs, complex procedures, and the use of toxic chemicals, rendering these methods inefficient and unsustainable. Altering synthesis methods of nanoparticles, however, can result in inconsistent nanoparticle sizing and morphology. Recently, there has been a growing focus on the synthesis of nanoparticles through combustion. Combustion synthesis has emerged as an alternative for nanoparticle production due to its comparatively low energy requirements and rapid production of high-purity nanoparticles Combustion synthesis is an adaptable synthesis route for the preparation of nanoparticles. During synthesis, reaction occurs between the fuel and oxidizer by an exothermic reaction. The fuel is used to burn the oxidizer completely to form the desired product and facilitate combustion to occur. The type of fuel utilized may influence the morphology of the synthesized nanoparticles. Further, the amount of gas produced during synthesis may affect the particle size and agglomeration of the nanoparticles. Thus, there is a need to identify a method of synthesizing nanoparticles in which a consistent particle size and morphology is achieved to optimize the desired size-dependent characteristics needed for the nanotechnology at hand. Additionally, most combustion synthesis methods rely on synthetic fuels or reducing agents that may be costly, hazardous, or environmentally detrimental, creating a need for environmentally friendly, non-toxic fuels for the synthesis of nanoparticles by combustion.

Accordingly, one objective of the present disclosure is to explore an innovative method for developing cobalt oxide nanoparticles using L-valine as a fuel. This method may circumvent the aforementioned stated drawbacks, like complex synthesis methods, high energy consumption, and the need for toxic solvents or complex equipment.

SUMMARY

In an exemplary embodiment, a method for synthesizing cobalt oxide ($Co_3O_4$) nanoparticles is described. The method comprises mixing an aqueous solution of a cobalt precursor and L-valine to obtain a reaction mixture and heating up the reaction mixture to temperature of at least 100 degrees Celsius (° C.) to obtain a dry powder. The method further comprises calcining the dry powder to obtain the cobalt oxide nanoparticles. The cobalt oxide nanoparticles have an average particle size of 200 nanometer (nm) or less. The cobalt oxide nanoparticles are substantially spherical and comprise mesopores having a total pore volume of 0.1 to 0.5 cubic centimeters per gram ($cm^3/g$).

In some embodiments, the calcining comprises calcining the dry powder at a temperature of 450 to 850° C. for 1 to 5 hours (h).

In some embodiments, the cobalt oxide nanoparticles have an average particle diameter of 85 nm or less.

In some embodiments, the mesopores have an average pore diameter of 8 nm or less.

In some embodiments, the cobalt precursor is at least one selected from a cobalt nitrate hydrate, a cobalt chloride hydrate, a cobalt oxalate hydrate, and a cobalt acetate hydrate.

In some embodiments, the cobalt precursor is cobalt nitrate hexahydrate ($Co(NO_3)_2 \cdot 6H_2O$).

In some embodiments, the cobalt oxide nanoparticles have an average particle size of 120 nm or less.

In some embodiments, the cobalt oxide nanoparticles have an average particle size of 115 nm.

In some embodiments, the mesopores have a total pore volume of 0.2 to 0.25 $cm^3/g$.

In some embodiments, the cobalt oxide nanoparticles have an average diameter of 75 nm or less.

In some embodiments, the calcining comprises calcining the powder at a temperature of 650° C. for 3 h.

In some embodiments, the mesopores have an average pore diameter of 6.85 nm.

In some embodiments, the heating comprises heating the reaction mixture to a temperature of 120° C. to obtain the dry powder.

In some embodiments, the cobalt oxide nanoparticles have an average crystallite size of 60 to 80 nm.

In some embodiments, the cobalt oxide nanoparticles have an average crystallite size of 68.85 nm.

In some embodiments, the cobalt oxide nanoparticles have a BET surface area of 75 meters squared per gram ($m^2/g$) or less.

In some embodiments, the cobalt oxide nanoparticles have a BET surface area of 66.83 $m^2/g$.

In some embodiments, the reaction mixture has a weight ratio of L-valine to cobalt precursor of 1:1 to 1:10.

In some embodiments, the reaction mixture has a weight ratio of L-valine to cobalt precursor of 1:7 to 1:8.

In some embodiments, the method further comprises forming a layer of the cobalt oxide nanoparticles on a substrate or a semiconductor.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "compound" refers to a chemical entity, regardless of its phase-solid, liquid, or gaseous—as well as its state-crude mixture, purified, or isolated.

As used herein, the term "particle" refers to a small object that acts as a whole unit with regard to its transport and properties.

As used herein, the terms "particle diameter" may be thought of as the length or longest dimension of a single particle. The greatest distance that can be measured from one point on a shape through its center to a point directly across from it is referred to as the "diameter" for a circle, oval, ellipse, and multilobe.

As used herein, the terms "particle size" may be thought of as the length or longest dimension of an agglomerate of particles. Agglomeration occurs when attractive forces between particles are stronger than repulsive forces. Smaller particles are more likely to agglomerate because they have a higher surface area and molecular gravity.

As used herein, the term "porosity" refers to a measure of the void (e.g., "pore") or vacant spaces within a material. Porosity is represented as a fraction of the volume of voids over the total volume, between 0 and 1, or as a percentage between 0% and 100%.

As used herein, the term "pore size" may be thought of as the length or longest dimension of a void (e.g., "pore") opening. The International Union of Pure and Applied Chemistry (IUPAC) classifies pore sizes into three categories. Macropores are pores with a length or longest dimension larger than 50 nm, mesopores are pores with a length or longest dimension between 2 and 50 nm, and micropores are pores with a length or longest dimension of less than 2 nm.

As used herein, "nanoparticles" refers to particles having a particle size of 1 to 200 nm within the scope of the present invention.

As used herein, the term "room temperature" refers to a temperature range of 25° C.±3° C. in the present disclosure.

As used herein, the term "calcination" refers to a thermal treatment of a solid chemical compound whereby the compound is raised to high temperature without melting under restricted supply of ambient oxygen, to control the size, crystallinity, and optical properties of nanoparticles.

As used herein, a "crystallite" refers to a single crystal within a larger particle that has atoms in a highly ordered arrangement. A crystallite is the smallest individual unit that a particle is made up of, with sizes generally ranging from nanometers to micrometers.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. Isotopes of cobalt (Co) are $^{56}Co$, $^{57}Co$, $^{58}Co$, and $^{60}Co$.

Isotopically labeled compounds of the disclosure may generally be prepared by conventional techniques known to those skilled in the art or by processes analogous to those described herein, using an appropriate isotopically labeled reagent in place of the non-labeled reagent otherwise employed.

Aspects of the present disclosure are directed to a method for synthesizing cobalt oxide nanoparticles through a combustion process utilizing L-valine as a fuel. The use of L-valine as a fuel in the combustion synthesis of cobalt oxide nanoparticles reduces the energy consumption and cost associated with the process. The method facilitates the rapid production of cobalt oxide nanoparticles with controlled size and morphology without the requirement for complex equipment or harsh chemicals, making it more sustainable and efficient alternative to conventional methods.

Figure 1:
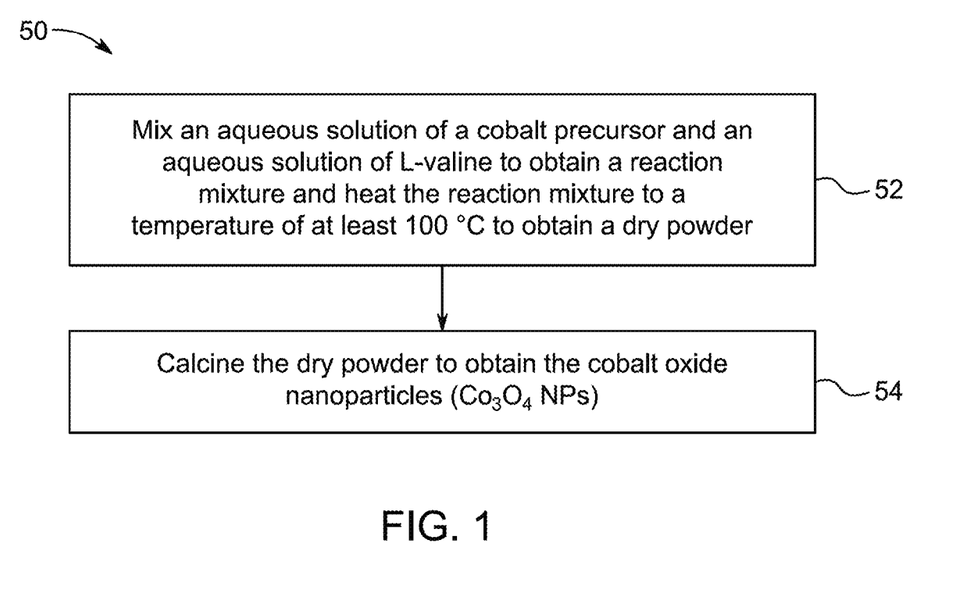
FIG. 1 is a method flowchart for synthesizing cobalt oxide nanoparticles, according to certain embodiments.

FIG. 1 illustrates a flow chart of a method 50 for synthesizing cobalt oxide nanoparticles. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 comprises mixing an aqueous solution of a cobalt precursor and an aqueous solution of L-valine to obtain a reaction mixture. The mixing may be carried out manually or with a stirrer. In one embodiment, the mixing comprises mixing the aqueous solution of the cobalt precursor and the aqueous solution of L-valine at a speed of 100 to 500 rotations per minute (rpm) to obtain the reaction mixture. In some embodiments, the speed is 150 to 450 rpm, preferably 200 to 400 rpm, preferably 200 to 350 rpm, preferably 200 to 300 rpm, preferably 200 to 250 rpm, most preferably 200 rpm. In one embodiment, the cobalt precursor may be selected from chloropentahammine cobalt chloride, hexaammine cobalt chloride, cobalt phosphate, ammonium cobalt sulfate, diammonium tetra nitrate cobalt, cobalt formate, cobalt tetraoxide, cobalt bromide, cobalt selenate, cobalt tungstate, cobalt molybdate, cobalt iodide, cobalt phosphate, hydrates thereof, and/or mixtures thereof. In alternate embodiments, the cobalt precursor is selected from a cobalt nitrate hydrate, a cobalt chloride hydrate, a cobalt oxalate hydrate, and a cobalt acetate hydrate. Preferably, the cobalt precursor is in a nitrate form because the nitrate form has greater water solubility, thereby achieving greater homogenization during synthesis of the reaction mixture. In a preferred embodiment, the cobalt precursor is cobalt nitrate hexahydrate ($Co(NO_3)_2 \cdot 6H_2O$).

L-valine is an essential branched-chain amino acid that plays a vital role in protein synthesis, muscle metabolism, and overall cellular function. L-valine can be used as a precursor or stabilizing agent in synthesizing various nanomaterials. This can affect the size, shape, and surface characteristics of the resulting nanostructures. It can also be used for the modification of nanoparticles, enhancing their ability to encapsulate and deliver therapeutic agents. In the present method, L-valine may act as both a reducing and stabilizing agent in the synthesis of nanoparticles, meaning it helps to reduce metal ions to their metallic state while also preventing the newly formed nanoparticles from clumping together, allowing for the creation of stable nanostructures. In a preferred embodiment, L-valine functions as a fuel for the combustion method. When heated, L-valine combusts, releasing heat. This exothermic process rapidly decomposes the cobalt precursor and facilitates the formation of the cobalt oxide nanoparticles. During combustion, L-valine breaks down and reacts with the oxygen provided by the cobalt precursor, producing gaseous byproducts. The remaining solid product is cobalt oxide ($Co_3O_4$), formed as a result of the combustion reaction. Using L-valine as a fuel in the combustion synthesis of cobalt oxide nanoparticles allows for a faster, simpler synthesis with controlled particle size and morphology, a reduction in energy consumption, and avoidance of the need for toxic solvents or complex equipment.

The reaction mixture is heated to a temperature of at least 100° C. to obtain a dry powder. In some embodiments, the reaction mixture is heated to a temperature of 101° C., preferably 102° C., preferably 103° C., preferably 104° C., preferably 105° C., preferably 106° C., preferably 107° C., preferably 108° C., preferably 109° C., preferably 110° C., preferably 111° C., preferably 112° C., preferably 113° C., preferably 114° C., preferably 115° C., preferably 116° C., preferably 117° C., preferably 118° C., preferably 119° C., most preferably 120° C. In a preferred embodiment, the reaction mixture is heated to a temperature of 120° C. to obtain a dry powder. The heating can be done by using heating appliances such as hot plates, muffle furnace, tube furnace, heating mantles ovens, microwaves, autoclaves, tapes, oil baths, salt baths, sand baths, air baths, hot-tube furnaces, hot-air guns, and other methods known in the art. An important aspect of the method for forming the cobalt oxide nanoparticles relates to the concurrent mixing and heating of the cobalt precursor and the fuel. Concurrently mixing and heating at a temperature above the boiling point of the solvent (e.g., an aqueous matrix) forms a dried product that undergoes calcining smoothly and consistently to form a product having a uniform and consistent morphological and crystalline feature.

In some embodiments, the reaction mixture has a weight ratio of L-valine to cobalt precursor of 1:1 to 1:10, preferably 1:2 to 1:9, preferably 1:3 to 1:8, preferably 1:4 to 1:8, preferably 1:5 to 1:8, preferably 1:6 to 1:8, most preferably 1:7 to 1:8. In alternative embodiments, the reaction mixture has a weight ratio of L-valine to cobalt precursor of 1:7.1 to 1:7.9, preferably 1:7.1 to 1:7.8, preferably 1:7.1 to 1:7.7, preferably 1:7.1 to 1:7.6, preferably 1:7.1 to 1:7.5, preferably 1:7.1 to 1:7.4, preferably 1:7.1 to 1:7.3, preferably 1:7.1 to 1:7.2, most preferably 1:7.14. In a preferred embodiment, the reaction mixture has a weight ratio of L-valine to cobalt precursor of 1:7.14.

At step 54, the method 50 comprises calcining the dry powder to obtain the cobalt oxide nanoparticles. The calcination is carried out by heating it to a high temperature, under a restricted supply of ambient oxygen, to control the size, crystallinity, and optical properties of the cobalt oxide nanoparticles. In some embodiments the calcining is performed by a furnace, however, any known method in the art may be used. The heating rate utilized during calcination can influence the final morphology of the cobalt oxide nanoparticles, such as the shape and size distribution. A slower heating rate allows for more controlled crystal growth, potentially leading to smaller and more uniform nanoparticles. In contrast, rapid heating can cause particles to agglomerate. In one embodiment, the calcining comprises calcining the dry powder at a heating rate of 1 to 15 degrees Celsius per minute (° C./min), preferably 1 to 14° C./min, preferably 1 to 13° C./min, preferably 1 to 12° C./min, preferably 1 to 11° C./min, preferably 1 to 10° C./min, preferably 1 to 9° C./min, preferably 1 to 8° C./min, preferably 1 to 7° C./min, preferably 1 to 6° C./min, preferably 1 to 5° C./min, preferably 1 to 4° C./min, preferably 1 to 3° C./min, preferably 1 to 2° C./min, most preferably 1° C./min. In one embodiment, the calcining comprises calcining the dry powder at a temperature of 450 to 850° C. for 1 to 5 h. In some embodiments, the calcining comprises calcining the dry powder at a temperature of 460 to 840° C., preferably 470 to 830° C., preferably 480 to 820° C., preferably 490 to 810° C., preferably 500 to 800° C., preferably 510 to 790° C., preferably 520 to 780° C., preferably 530 to 770° C., preferably 540 to 760° C., preferably 550 to 750° C., preferably 560 to 740° C., preferably 570 to 730° C., preferably 580 to 720° C., preferably 590 to 710° C., preferably 600 to 700° C., preferably 610 to 690° C., preferably 620 to 680° C., preferably 630 to 670° C., most preferably 640 to 660° C. In some embodiments, the calcining comprises calcining the dry powder for 2 to 4 h, most preferably 3 h. In a preferred embodiment, the powder is calcined at a temperature of 650° C. for 3 h.

In some embodiments, the cobalt oxide nanoparticles have an average crystallite size of 60 to 80 nm, preferably 61 to 79 nm, preferably 62 to 78 nm, preferably 63 to 77 nm, preferably 64 to 76 nm, and preferably 65 to 75 nm, preferably 66 to 74 nm, preferably 67 to 73 nm, preferably 68 to 72 nm, preferably 68 to 71 nm, preferably 68 to 70 nm, preferably 68 to 89 nm, most preferably 68.85 nm. In a preferred embodiment, the cobalt oxide nanoparticles have an average crystallite size of 68.85 nm. In some embodiments, the cobalt oxide nanoparticles have an average particle size of 200 nm or less, preferably 195 nm or less, preferably 190 nm or less, preferably 185 nm or less, preferably 180 nm or less, preferably 175 nm or less, preferably 170 nm or less, preferably 165 nm or less, preferably 160 nm or less, preferably 155 nm or less, preferably 150 nm or less, preferably 145 nm or less, preferably 140 nm or less, preferably 135 nm or less, preferably 130 nm or less, preferably 125 nm or less, preferably 120 nm or less, most preferably 115.90 nm. In a preferred embodiment, the cobalt oxide nanoparticles have an average particle size of 115.90 nm. In some embodiments, the cobalt oxide nanoparticles have an average particle diameter of 85 nm or less, preferably 84 nm or less, preferably 83 nm or less, preferably 82 nm or less, preferably 81 nm or less, preferably 80 nm or less, preferably 79 nm or less, preferably 78 nm or less, preferably 77 nm or less, preferably 76 nm or less, preferably 75 nm or less, preferably 74 nm or less, preferably 73 nm or less, most preferably 72.14 nm. In a preferred embodiment, the cobalt oxide nanoparticles have an average particle diameter of 72.14 nm.

An important aspect of the method is that the cobalt oxide nanoparticles produced have a uniform and consistent morphological and crystalline feature. D50 and D90 are parameters utilized to further describe the particle diameter of a powder, particularly the distribution of the particle diameters of the produced nanoparticles. The D90 is the particle diameter at which 90% of the particles are smaller and 10% are larger, while the D50 is the particle diameter at which 50% of the particles are smaller and 50% are larger. In one embodiment, the D90 of the cobalt oxide nanoparticles is 85 nm or less, preferably 84 nm or less, preferably 83 nm or less, preferably 82 nm or less, preferably 81 nm or less, preferably 80 nm or less, preferably 79 nm or less, preferably 78 nm or less, preferably 77 nm or less, preferably 76 nm or less, preferably 75 nm or less, preferably 74 nm or less, most preferably 73 nm or less. In one embodiment, the D50 of the cobalt oxide nanoparticles is 125 nm or less, preferably 124 nm or less, preferably 123 nm or less, preferably 122 nm or less, preferably 121 nm or less, preferably 120 nm or less, preferably 119 nm or less, preferably 118 nm or less, preferably 117 nm or less, most preferably 116 nm or less.

The Brunauer-Emmet-Teller (BET) hypothesis is a method for determining the specific surface area of a material based on the physical adsorption of gas molecules on a solid surface. Specific surface area is a property of solids, which is the total surface area of a material per unit of mass, solid or bulk volume, or cross-sectional area. In some embodiments, BET surface area is measured by gas adsorption analysis, preferably $N_2$ adsorption analysis (e.g., $N_2$ adsorption isotherms). In some embodiments, the cobalt oxide nanoparticles have a BET surface area of 75 m²/g or less, preferably 74 m²/g or less, preferably 73 m²/g or less, preferably 72 m²/g or less, preferably 71 m²/g or less, preferably 70 m²/g or less, preferably 69 m²/g or less, most preferably 66.83 m²/g. In a preferred embodiment, the cobalt oxide nanoparticles have a BET surface area of 66.83 m²/g.

In some embodiments, the cobalt oxide nanoparticles may exist in various morphological shapes, such as nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc., and mixtures thereof. In a preferred embodiment, the cobalt oxide nanoparticles are substantially spherical.

In some embodiments, the cobalt oxide nanoparticles are porous. Pore size may be determined by any known method including, but not limited to, gas adsorption (e.g. $N_2$ adsorption), mercury intrusion porosimetry, and imaging techniques such as scanning electron microscopy (SEM), and X-ray computed tomography (XRCT). In some embodiments, pore diameter and pore volume are measured by gas adsorption analysis, preferably $N_2$ adsorption analysis (e.g., $N_2$ adsorption isotherms). In some embodiments, the cobalt oxide nanoparticles comprise mesopores. In one embodiment, the mesopores have an average pore diameter of 15 nm or less, preferably 14 nm or less, preferably 13 nm or less, preferably 12 nm or less, preferably 11 nm or less, preferably 10 nm or less, preferably 9 nm or less, preferably 8 nm or less, preferably 7 nm or less, most preferably 6.85 nm. In a preferred embodiment, the mesopores have an average pore diameter of 6.85 nm. In some embodiments, the cobalt oxide nanoparticles comprise mesopores having a total pore volume of 0.1 to 0.5 cm³/g. In some embodiments, the mesopores have a total pore volume of 0.11 to 0.49 cm³/g, preferably 0.12 to 0.48 cm³/g, preferably 0.13 to 0.47 cm³/g, preferably 0.14 to 0.46 cm³/g, preferably 0.15 to 0.45 cm³/g, preferably 0.16 to 0.44 cm³/g, preferably 0.17 to 0.43 cm³/g, preferably 0.18 to 0.42 cm³/g, preferably 0.19 to 0.41 cm³/g, preferably 0.20 to 0.40 cm³/g, preferably 0.21 to 0.39 cm³/g, preferably 0.22 to 0.38 cm³/g, preferably 0.22 to 0.37 cm³/g, preferably 0.22 to 0.36 cm³/g, preferably 0.22 to 0.35 cm³/g, preferably 0.22 to 0.34 cm³/g, preferably 0.22 to 0.33 cm³/g, preferably 0.22 to 0.32 cm³/g, preferably 0.22 to 0.31 cm³/g, preferably 0.22 to 0.30 cm³/g, preferably 0.22 to 0.29 cm³/g, preferably 0.22 to 0.28 cm³/g, preferably 0.22 to 0.27 cm³/g, preferably 0.22 to 0.26 cm³/g, preferably 0.22 to 0.25 cm³/g, preferably 0.22 to 0.24 cm³/g, most preferably 0.22 to 0.23 cm³/g. In a preferred embodiment, the cobalt oxide nanoparticles comprise mesopores having a total pore volume of 0.2275 cm³/g.

In some embodiments, the method 50 further includes forming a layer of the cobalt oxide nanoparticles on a substrate or a semiconductor. The substrate may be conductive carbon substrate, graphite substrate, an aluminum foam, a nickel foam, a titanium foam, a titanium alloy foam, an aluminum alloy foam, a magnesium alloy foam, a nickel alloy foam, or a steel foam. In some embodiments, layer of the cobalt oxide nanoparticles may be formed on the surface of the substrate/semiconductor using one of the techniques like the drop-casting method, spray coating, spin coating, dip coating, physical vapor deposition (PVD), aerosol-assisted chemical vapor deposition (AACVD), or molecular beam epitaxy (MBE). The coating of cobalt oxide nanoparticles on the substrate or semiconductor forms an electrode which serve as efficient electrocatalysts for electrocatalytic reactions (hydrogen and oxygen evolution). The porous structure exposes more active sites on a given electrode and promotes electrolyte penetration and transfer.

Additionally, the synthesized cobalt oxide nanoparticles, due to their high surface area and mesoporous structure, can serve as effective catalysts or catalyst supports in chemical reactions. Furthermore, the mesoporous nature and significant surface area make these nanoparticles additionally suitable for use in adsorption processes, including the removal of contaminants from water and air. Additionally, the defined crystal structure and uniform morphology demonstrate potential use in energy storage devices, such as batteries and supercapacitors.

EXAMPLES

The following examples demonstrate the fabrication of cobalt oxide nanoparticles via fuel combustion method. The examples are provided solely for illustration and are not to be construed as limitations of the present disclosure, as many variations thereof are possible without departing from the spirit and scope of the present disclosure.

Example 1: Synthesis of Cobalt Oxide Nanoparticles

All chemicals used in this present disclosure were purchased from Sigma-Aldrich Chemical Company. Cobalt (II) nitrate hexahydrate ($Co(NO_3)_2 \cdot 6H_2O$) and L-valine ($C_5H_{11}NO_2$) were employed as the primary reagents in the synthesis of cobalt oxide nanoparticles.

Figure 2:
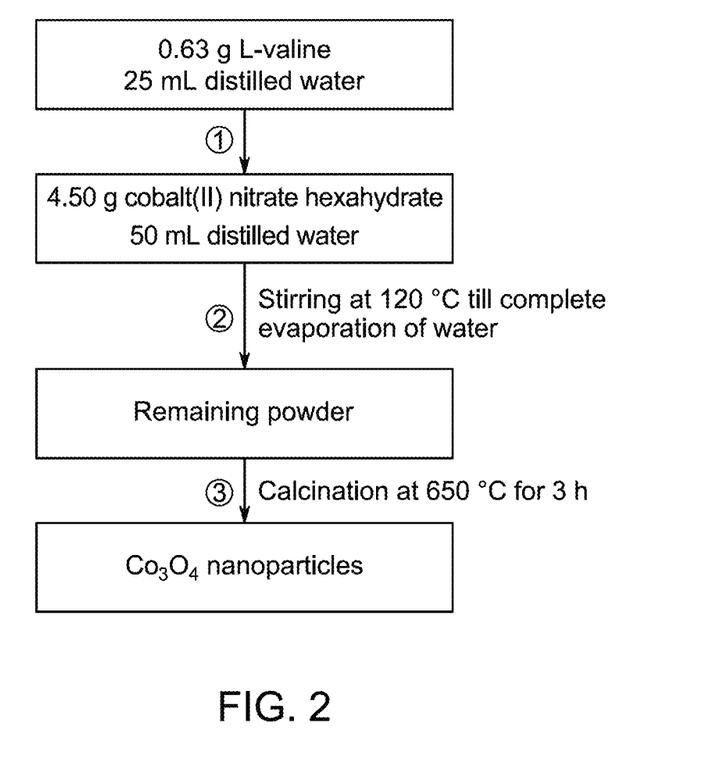
FIG. 2 shows experimental steps for the preparation of cobalt oxide nanoparticles, according to certain embodiments.

To synthesize cobalt oxide nanoparticles, 4.50 grams (g) of cobalt nitrate hexahydrate ($Co(NO_3)_2 \cdot 6H_2O$) was dissolved in 50 milliliters (mL) of distilled water. Separately, 0.63 g of L-valine was dissolved in 25 mL of distilled water. The solution of L-valine was then added to the cobalt nitrate solution with constant stirring at 120° C. until complete evaporation of the water. The resulting powder was then calcined at 650° C. for 3 hours (h) to obtain the cobalt oxide nanoparticles, as shown in FIG. 2.

In this reaction, $Co(NO_3)_2 \cdot 6H_2O$ serves as the cobalt precursor, and L-valine acts as a fuel. When heated, L-valine combusts releasing heat. This exothermic process rapidly decomposes the cobalt precursor and facilitates the formation of cobalt oxide nanoparticles. During the combustion process, L-valine decomposes and reacts with the oxygen provided by the nitrates in cobalt nitrate, generating gaseous byproducts such as nitrogen ($N_2$), carbon dioxide ($CO_2$), and water vapor ($H_2O$). The remaining solid product is $Co_3O_4$, formed as a result of the combustion reaction. The corresponding chemical equation is shown in Eq. 1.

$$81\ Co(NO_3)_2 \cdot 6H_2O + 28C_5H_{11}NO_2 \rightarrow 27Co_3O_4 + 95N_2 + 140CO_2 + 160\ H_2O \quad (1)$$

Example 2: X-Ray Diffraction (XRD) Analysis

Figure 3:
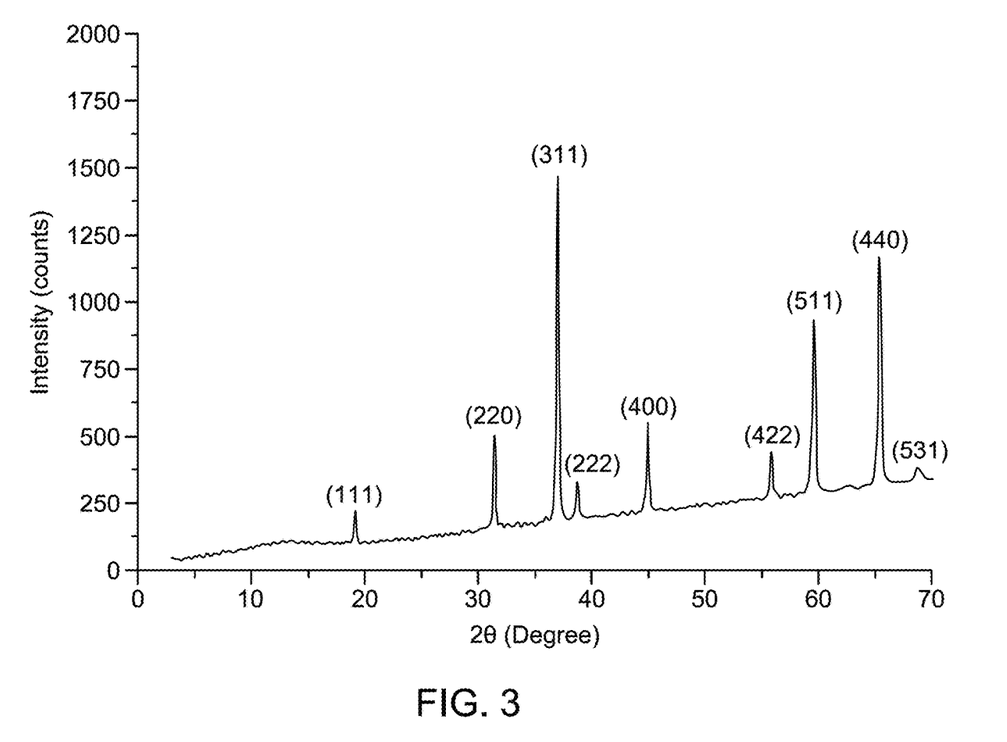
FIG. 3 shows an X-ray diffraction (XRD) pattern for the cobalt oxide nanoparticles, according to certain embodiment.

The XRD pattern of the cobalt oxide nanoparticles was analyzed and matched with the joint committee on powder diffraction standards (JCPDS) card number 01-076-1802, confirming a cubic crystal system, as shown in FIG. 3. The diffraction peaks were observed at the angles 19.01°, 31.30°, 36.90°, 38.56°, 44.89°, 55.73°, 59.40°, 65.28°, and 68.77°, which correspond to the Miller indices (111), (220), (311), (222), (400), (422), (511), (440), and (531), respectively. The average crystallite size of the cobalt oxide nanoparticle sample was determined to be 68.85 nm.

Example 3: Field Emission Scanning Electron Microscopy (FE-SEM) Analysis

Figure 4:
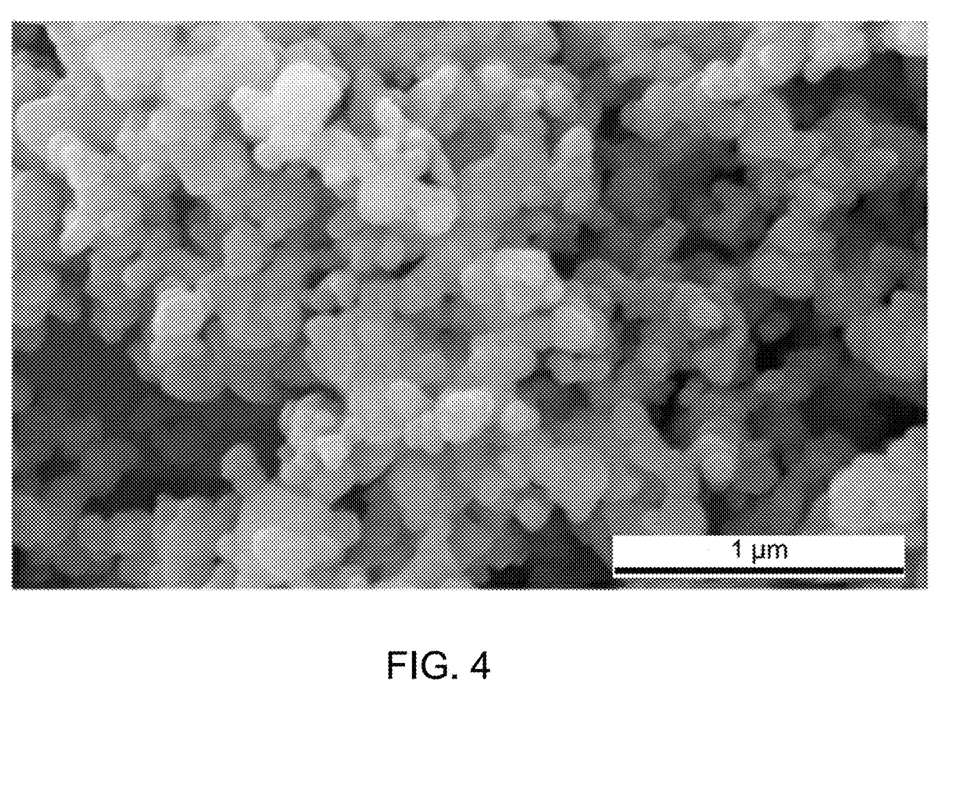
FIG. 4 shows a field emission scanning electron microscopy (FE-SEM) image of the cobalt oxide nanoparticles, according to certain embodiments.

FIG. 4 shows the FE-SEM image of cobalt oxide nanoparticles. The image reveals that the cobalt oxide nanoparticles possess an aggregated morphology, consisting of numerous particles with varying shapes and sizes. The particles appear to be loosely packed and exhibit a nearly spherical shape, contributing to the porous structure. The average particle size is 115.90 nm, suggesting that the synthesis method effectively produces cobalt oxide nanoparticles with a uniform and controlled morphology. This nanoscale size and spherical shape are beneficial for various applications, such as catalysis, optoelectronics, and biomedical uses, where particle uniformity and surface characteristics play a significant role in enhancing performance and functionality

Figure 5:
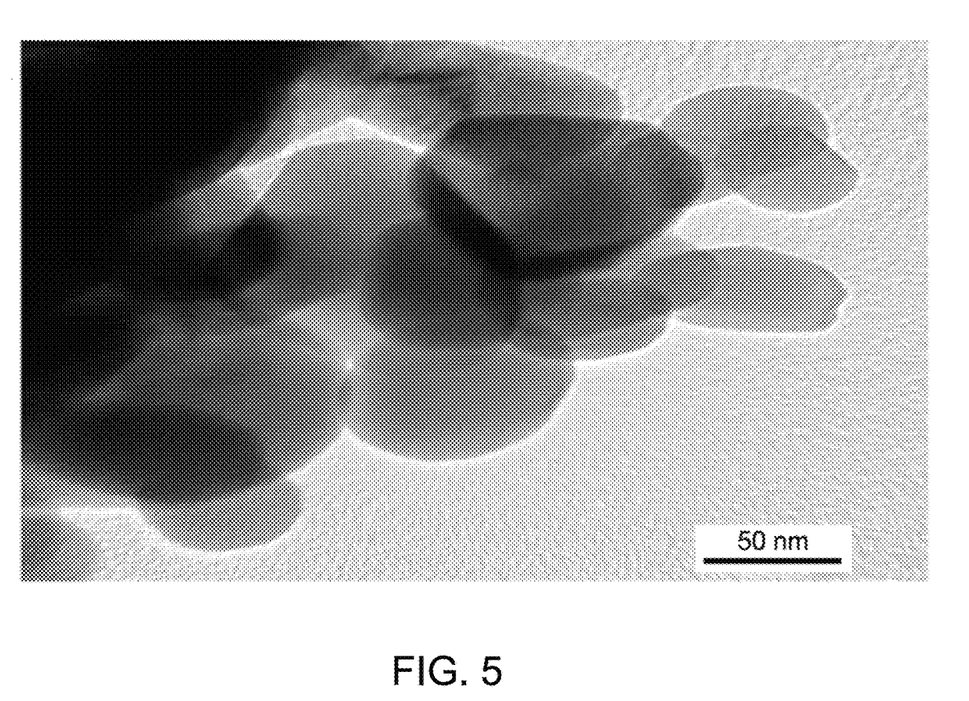
FIG. 5 shows a high-resolution transmission electron microscopy (HR-TEM) image for cobalt oxide nanoparticles, according to certain embodiments.

Example 4: High-Resolution Transmission Electron Microscopy (HRTEM) Analysis FIG. 5 presents an HR-TEM image of cobalt oxide nanoparticles. The image reveals that the nanoparticles are relatively uniform in shape, with a nearly spherical morphology. The particles are well-dispersed, and no significant agglomeration is observed, indicating effective synthesis and stabilization. The average particle diameter of the cobalt oxide nanoparticles is 72.14 nm, demonstrating the nanoscale size of the particles. The clarity of the boundaries between the nanoparticles further confirms the crystalline nature of the material, consistent with the XRD results that support the formation of cobalt oxide nanoparticles with a defined cubic crystal structure. This nanoscale size and spherical shape are beneficial for various applications, such as catalysis, optoelectronics, and biomedical uses, where particle uniformity and surface characteristics play a significant role in enhancing performance and functionality.

Example 5: Brunauer-Emmett-Teller (BET) Analysis

Figure 6:
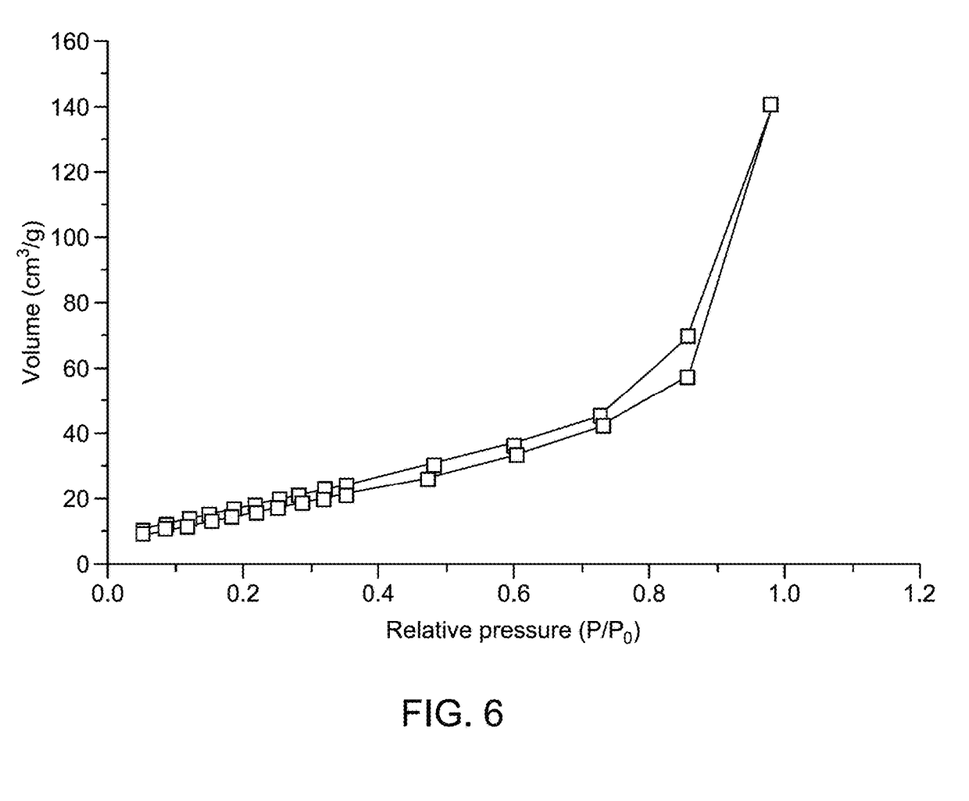
FIG. 6 shows a nitrogen ($N_2$) adsorption/desorption isotherm of cobalt oxide nanoparticles, according to certain embodiments.

FIG. 6 illustrates the nitrogen ($N_2$) adsorption-desorption isotherm of cobalt oxide nanoparticles, showing a characteristic Type IV isotherm with a hysteresis loop, which is typically associated with mesoporous materials. The isotherm demonstrates an initial gradual increase in volume with relative pressure, followed by a sharp rise near the saturation point, indicating the presence of mesopores within the material. Table 1 presents the surface textural properties of the cobalt oxide nanoparticles, revealing a BET surface area of 66.83 m²/g, a total pore volume of 0.2275 cm³/g, and a mean pore diameter of 6.85 nm. The presence of mesopores in the cobalt oxide nanoparticles sample is further supported by the average pore size, which is greater than 2 nm, confirming the mesoporous nature of the material. This combination of a moderate surface area and relatively large pore size suggests that the cobalt oxide nanoparticles possess a porous structure that can enhance their application potential in adsorption and catalysis processes.

TABLE 1

| BET surface area (m²/g) | Total pore volume (cm³/g) | Mean pore diameter (nm) |
|---|---|---|
| 66.83 | 0.2275 | 6.85 |

Numerous modifications and variations of the present disclosure are possible in light of the above teachings. It is, therefore, to be understood that within the scope of the appended claims, the invention may be practiced otherwise than as specifically described herein.

The invention claimed is:

1. A method for synthesizing cobalt oxide nanoparticles, comprising:
   mixing an aqueous solution of a cobalt precursor and an aqueous solution of L-valine to obtain a reaction mixture while heating the reaction mixture at a temperature of at least 100° C. to obtain a dry powder; and
   calcining the dry powder at a temperature of at least 650° C. to obtain the cobalt oxide nanoparticles,
   wherein the cobalt oxide nanoparticles have an average particle size of 200 nm or less, and
   wherein the cobalt oxide nanoparticles are substantially spherical and comprise mesopores having a total pore volume of 0.1 to 0.5 cm$^3$/g and an average pore diameter of 8 nm or less.

2. The method of claim 1, wherein the calcining comprises calcining the dry powder at a temperature of 650 to 850° C. for 1 to 5 h.

3. The method of claim 1, wherein the cobalt oxide nanoparticles have an average particle diameter of 85 nm or less.

4. The method of claim 1, wherein the cobalt precursor is at least one selected from a cobalt nitrate hydrate, a cobalt chloride hydrate, a cobalt oxalate hydrate, and a cobalt acetate hydrate.

5. The method of claim 1, wherein the cobalt precursor is cobalt nitrate hexahydrate ($Co(NO_3)_2 \cdot 6H_2O$).

6. The method of claim 1, wherein the cobalt oxide nanoparticles have an average particle size of 120 nm or less.

7. The method of claim 1, wherein the cobalt oxide nanoparticles have an average particle size of 115.90 nm.

8. The method of claim 1, wherein the mesopores have a total pore volume of 0.2 to 0.25 cm$^3$/g.

9. The method of claim 1, wherein the cobalt oxide nanoparticles have an average particle diameter of 75 nm or less.

10. The method of claim 1, wherein the calcining comprises calcining the dry powder at a temperature of 650° C. for 3 h.

11. The method of claim 1, wherein the mesopores have an average pore diameter of 6.85 nm.

12. The method of claim 1, wherein the heating comprises heating the reaction mixture to a temperature of 120° C. to obtain the dry powder.

13. The method of claim 1, wherein the cobalt oxide nanoparticles have an average crystallite size of 60 to 80 nm.

14. The method of claim 1, wherein the cobalt oxide nanoparticles have an average crystallite size of 68.85 nm.

15. The method of claim 1, wherein the cobalt oxide nanoparticles have a BET surface area of 75 m$^2$/g or less.

16. The method of claim 1, wherein the cobalt oxide nanoparticles have a BET surface area of 66.83 m$^2$/g.

17. The method of claim 1, wherein the reaction mixture has a weight ratio of L-valine to cobalt precursor of 1:1 to 1:10.

18. The method of claim 1, wherein the reaction mixture has a weight ratio of L-valine to cobalt precursor of 1:7 to 1:8.

19. The method of claim 1, further comprising:
    forming a layer of the cobalt oxide nanoparticles on a substrate or a semiconductor.

20. The method of claim 1, wherein the calcining of the dry powder is performed at a heating rate of from 1° C. to 15° C. per minute.

* * * * *